United States Patent [19]
Hudson et al.

[11] 3,972,380
[45] Aug. 3, 1976

[54] VEHICLE WITH REGENERATIVE POWER SYSTEM

[76] Inventors: Perley N. Hudson, 816 Phillip Parker Road; William R. Toby, 609 Comal, both of Fort Worth, Tex. 76108

[22] Filed: Apr. 11, 1975

[21] Appl. No.: 567,176

[52] U.S. Cl. .............................. 180/65 R; 290/1 C
[51] Int. Cl.² ............................................ B60K 1/00
[58] Field of Search ............. 180/65 R, 65 D, 65 C, 180/65 DD; 310/67; 290/45, 50, 16, 1 C

[56] References Cited
UNITED STATES PATENTS

| | | | |
|---|---|---|---|
| 1,423,090 | 9/1922 | Delano | 180/65 R |
| 1,562,903 | 11/1925 | Miller | 180/65 R |
| 3,499,163 | 3/1970 | Verreault | 180/65 R |
| 3,530,356 | 9/1970 | Aronson | 180/65 R |
| 3,616,872 | 11/1971 | Taylor | 180/65 R |
| 3,861,485 | 1/1975 | Busch | 180/65 R |
| 3,861,487 | 1/1975 | Gill | 180/65 R |
| 3,874,472 | 4/1975 | Deane | 180/65 R |

*Primary Examiner*—M. H. Wood, Jr.
*Assistant Examiner*—David M. Mitchell
*Attorney, Agent, or Firm*—Clarence A. O'Brien; Harvey B. Jacobson

[57] ABSTRACT

A wheeled vehicle is provided including a main frame having a plurality of ground engageable support wheels. An electric motor is supported from the main frame and drive train structure drivingly connects the rotatable output shaft of the motor to at least one of the ground engaging support wheels. A bank of rechargeable storage batteries is also supported from the main frame and electrically connected to the motor for actuation thereof through a variable voltage control. Also, a pair of generators or alternators are supported from the main frame and are driven from at least one of the ground engaging support wheels of the vehicle. The generators or alternators are electrically connected to the bank of storage batteries for recharging the latter. At least one of the generators is electrically connected to the bank of storage batteries through a voltage regulator and the circuit electrically connecting the other generator or alternator to the bank of storage batteries may include a control switch actuated to a closed position upon initial depression of the brake pedal of the associated vehicle. It is intended that the generators or alternators will be used to partially recharge the bank of batteries when the vehicle is coasting to a stop or coasting downhill.

4 Claims, 3 Drawing Figures

VEHICLE WITH REGENERATIVE POWER SYSTEM

BACKGROUND OF THE INVENTION

Various types of electrically powered vehicles equipped with storage batteries have heretofore been provided and some of these vehicles have included wheel driven alternators and/or generators for recharging the storage batteries when the vehicle is decelerating. However, most vehicles of this type have heretofore not included alternator or generator drive systems offering variable drive ratios or controls whereby one or more alternators may be automatically electrically connected to the storage batteries for partially recharging the same whenever the vehicle is in forward motion.

Examples of previously patented electric vehicles including some of the basic structural features of the instant invention are disclosed in U.S. Pat. Nos. 827,766, 1,562,903, 3,476,201, 3,616,872, and 3,845,835.

SUMMARY OF THE INVENTION

The vehicle of the instant invention has been designed primarily as an electric vehicle deriving its electromotive force from a bank of storage batteries carried on the vehicle. The bank of storage batteries may be readily recharged through the utilization of a battery charger at a location having a suitable source of electrical potential whenever the bank of storage batteries has been partially discharged. Further, the vehicle includes on-board wheel-driven alternators or generators which may be electrically connected to the storage batteries for recharging the same at anytime the vehicle is in forward motion.

The main object of this invention is to provide an electric vehicle powered from a bank of storage batteries of the rechargeable type and including means whereby the storage batteries may be partially recharged whenever the vehicle is in forward motion.

Another object of this invention, in accordance with the immediately preceding object, is to provide an electric vehicle including wheel driven generators or alternators which may be driven at varying gear ratios in order to partially recharge the storage batteries of the vehicle.

Still another object of this invention is to provide a two speed transmission drive for the generators so as to enable the generators to apply a greater braking action on the vehicle when the generators are driven at the high speed ratio.

A final object of this invention is to provide a vehicle in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
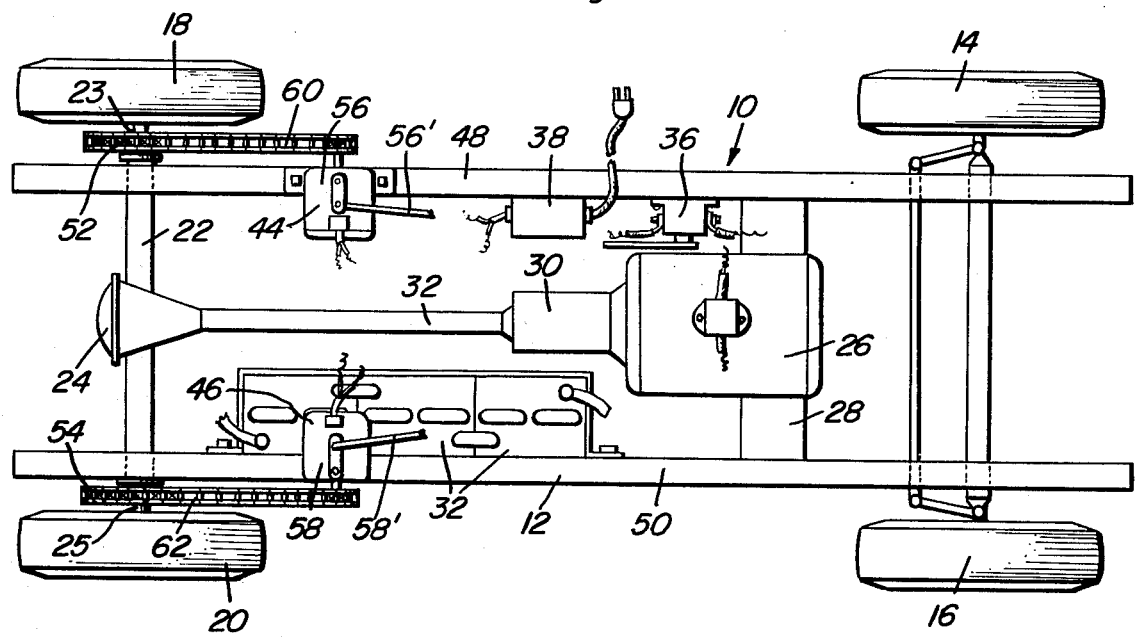
FIG. 1 is a top plan view of the chassis of the vehicle of the instant invention illustrating the electric motor driven drive train of the vehicle and the alternators or generators utilized for recharging the storage batteries of the vehicle as well as the drive trains for the generators or alternators.
Figure 2:
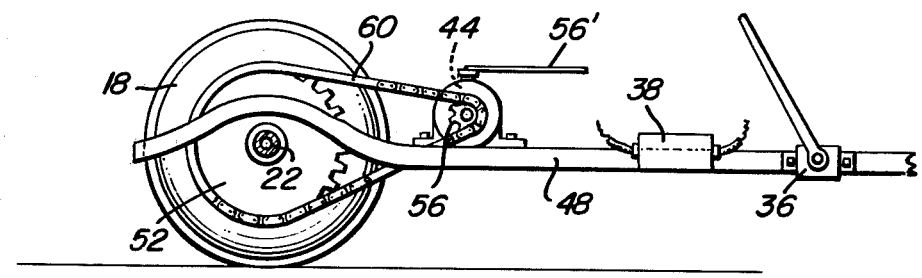
FIG. 2 is a fragmentary side elevational view of the assemblage illustrated in FIG. 1 with parts thereof being broken away and illustrated in vertical section and illustrating a portion of the chain drive for one of the alternators.
Figure 3:
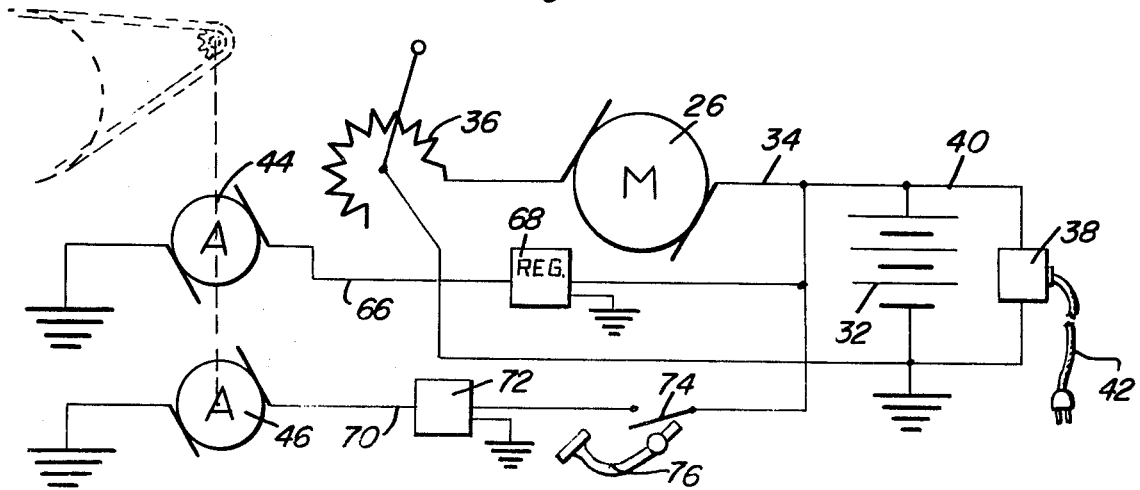
FIG. 3 is a diagrammatic view illustrating the electrical circuitry of the vehicle.

Referring now more specifically to the drawings, the numeral 10 generally designates the vehicle of the instant invention. The vehicle 10 includes a main frame referred to in general by the reference numeral 12 including front steerable wheels 14 and 16 and rear driving wheels 18 and 20 journaled from a rear axle assembly 22 including the usual center third member 24. The center third member is drivingly connected to half axles 23 and 25 disposed within the rear axle assembly 22 and the outer ends of the half axles support the wheels 18 and 20.

An electric motor 26 is supported from a forward transverse member 28 of the frame 12 and the motor 26 includes a rotatable output shaft (not shown) drivingly coupled to the input shaft of a transmission 30 whose output shaft is drivingly connected to a drive shaft 31 at the forward end of the drive shaft. The rear end of the drive shaft 31 is drivingly connected to the input shaft (not shown) of the third member.

The foregoing, except for the electric motor 26 comprises a description of a conventional motor vehicle drive train.

The vehicle 10 further includes a bank of storage batteries 32 serially connected in a loop circuit 34 in which the motor 26 as well as a rheostat or other suitable voltage control 36 are serially connected. The frame 12 additionally supports a storage battery charger 38 serially connected in a second loop circuit 40 connected in parallel with the circuit 34 to the bank of batteries 32 and the charger 38 includes an input extension cord 42 by which the charger 38 may be electrically connected to any suitable source of electrical potential.

A pair of alternators 44 and 46 are mounted on opposite side longitudinal members 48 and 50 of the frame 12 and the half axles from which the wheels 18 and 20 are supported include sprocket wheels 52 and 54 mounted thereon. The alternators 44 and 46 include two speed transmissions 56 and 58 of conventional design provided with sprocket wheel equipped input shafts driven from the sprocket wheels 52 and 54 by means of drive chains 60 and 62 and also including controls 56' and 58' which may be actuated by the driver of the vehicle 10. The transmissions 56 and 58 are capable of driving the alternators 44 at either a 1:3 ratio or 1:6 ratio.

The alternator 44 is serially connected in a circuit 66 having a regulator 68 serially connected therein and the circuit 66 is electrically connected to the bank of storage batteries 32. Further, the alternator 46 is serially connected in a circuit 70 which also includes a regulator 72 and the circuit 70 is connected to the storage batteries 32 for charging the same but includes a control switch 74 serially connected therein. The control switch 74 is normally open, but may be closed upon initial depression of the brake pedal 76 of the vehicle 10. When the vehicle 10 is decelerating down a hill which would normally require conventional braking of the vehicle 10, as soon as the brake pedal 76 is initially depressed the switch 74 is closed and the alternator 46 is thereby electrically connected to the storage batteries 32 through the regulator 72 for charging the storage batteries. Of course, the additional power required to drive the alternator 46 acts as a further brake on the vehicle 10 and thus reduces the need for braking the vehicle 10 by means of its conventional brake system. Further, the control switch 74 could be omitted and storage batteries 32 would be charging at all times vehicle is in forward motion. However, the two speed transmissions 56 and 58 may have their controls 56' and 58' actuated to drive the alternators 44 and 46 at slow speed ratio when the motor 26 is being used to drive the vehicle 10 and at high speed ratio when the vehicle is coasting downhill or being slowed to a stop.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a vehicle including a frame having a plurality of ground engageable wheel means, an electric motor having a rotatable output shaft, rotating drive train means drivingly connecting said output shaft to said wheel means, a bank of rechargeable storage batteries supported from said frame, a pair of electric current generators including rotatable input shafts, drive means drivingly connecting said wheel means to said input shafts, and parallel first and second circuits electrically connecting said generators to said storage batteries and said batteries to said motor, respectively, said second circuit including voltage control means electrically connected therein for selectively controlling the voltage of current flow from said batteries to said motor, said drive means including a pair of two speed ratio transmissions each selectively driving a corresponding input shaft at a selected drive ratio of two available drive ratios.

2. The combination of claim 1 wherein said first circuit includes a regulator electrically connected therein for controlling the input of electrical potential from said generators to said batteries.

3. The combination of claim 2 wherein said voltage control means comprises a rheostat.

4. The combination of claim 1 including a battery charger mounted on said vehicle and electrically connected to said bank of batteries for charging the same, said battery charger including electrical potential input circuit means for electrical connection with a suitable source of household current.

* * * * *